United States Patent
Edwards (10) Patent No.: US 11,152,803 B2
(45) Date of Patent: Oct. 19, 2021

(54) INOPERABLE BATTERY CHARGER DETECTION AND NOTIFICATION FOR ELECTRIC VEHICLES

(71) Applicant: Club Car, LLC, Evans, GA (US)

(72) Inventor: Robert H. Edwards, Martinez, GA (US)

(73) Assignee: CLUB CAR, LLC, Evans, GA (US)

( * ) Notice: Subject to any disclaimer, the term of this patent is extended or adjusted under 35 U.S.C. 154(b) by 0 days.

(21) Appl. No.: 14/984,916

(22) Filed: Dec. 30, 2015

(65) Prior Publication Data

US 2017/0194802 A1 Jul. 6, 2017

(51) Int. Cl.
  H02J 7/00 (2006.01)
  B60L 53/31 (2019.01)
  B60L 3/00 (2019.01)
  H02J 7/02 (2016.01)

(52) U.S. Cl.
  CPC .............. *H02J 7/0047* (2013.01); *B60L 3/00* (2013.01); *B60L 53/31* (2019.02); *H02J 7/00* (2013.01); *H02J 7/027* (2013.01); *Y02T 10/70* (2013.01); *Y02T 10/7072* (2013.01); *Y02T 90/12* (2013.01); *Y02T 90/14* (2013.01)

(58) Field of Classification Search
  CPC ................................................... H02J 7/0047
  See application file for complete search history.

(56) References Cited

U.S. PATENT DOCUMENTS

| | | | |
|---|---|---|---|
| 5,202,617 A | 4/1993 | Nor | |
| 5,803,215 A | 9/1998 | Henze et al. | |
| 6,963,186 B2 | 11/2005 | Hobbs | |
| 7,411,371 B2 | 8/2008 | Hobbs | |
| 8,386,103 B2 | 2/2013 | Tran | |
| 8,473,131 B2 | 6/2013 | Leary | |
| 8,718,856 B2 | 5/2014 | Leary | |
| 9,199,546 B2 | 12/2015 | King | |
| 2003/0141845 A1* | 7/2003 | Krieger | H02J 7/0054 320/132 |
| 2008/0218122 A1 | 9/2008 | Takano et al. | |
| 2011/0074351 A1 | 3/2011 | Bianco et al. | |
| 2011/0175569 A1* | 7/2011 | Austin | B60L 11/1824 320/109 |
| 2013/0207455 A1 | 8/2013 | Doljack | |

(Continued)

FOREIGN PATENT DOCUMENTS

JP 08140288 A * 5/1996

OTHER PUBLICATIONS

JPH08140288 translation May 1996, Miyazawa.*

*Primary Examiner* — Drew A Dunn
*Assistant Examiner* — Tynese V McDaniel
(74) *Attorney, Agent, or Firm* — Edell, Shapiro & Finnan, LLC (57) ABSTRACT

A battery charger detection system is provided. The battery charger detection system includes a battery charger, an indicator, and a controller. The controller detects an initial electrical coupling of the battery charger to a battery and measures a first voltage of the battery upon the electrical coupling. The controller further measures a second voltage of the battery and actuates the indicator in response to both a continued electrical coupling between the battery charger and the battery and the second voltage being less than or equal to the first voltage after a predetermined length of time.

9 Claims, 3 Drawing Sheets

(56) References Cited

U.S. PATENT DOCUMENTS

| | | | |
|---|---|---|---|
| 2013/0241481 A1* | 9/2013 | King | B60L 11/1824 320/109 |
| 2015/0042278 A1 | 2/2015 | Leary | |
| 2016/0103189 A1* | 4/2016 | DeMarco | G01R 31/343 324/764.01 |

* cited by examiner

INOPERABLE BATTERY CHARGER DETECTION AND NOTIFICATION FOR ELECTRIC VEHICLES

BACKGROUND

Technical Field

The present disclosure relates to the charging of electric vehicles and, in particular, to battery charging systems of electric vehicles.

State of the Art

Electric vehicles, such as golf carts and other utility vehicles, require regular charging of the flooded lead-acid batteries to ensure they are available for use. Currently, when an electric vehicle is connected to a charger, the attendant can observe a visual indicator on the charger or listen for an audible signal that the battery is charging.

For fleet operations, as in golf course facilities, where numerous vehicles are being managed by the attendant, the time may not be taken to verify each charger is indeed operating properly and charging the battery. Also, due to facility constraints and methods of charger mounting, the visual indicator may not be readily visible and the audible signal may not be distinguishable between so many vehicles. These factors can result in non-functional chargers going undetected, which results in the vehicle not being available for service when required.

There is thus a need to provide a means and/or method to ensure the proper charging of electric vehicles.

SUMMARY

The present disclosure relates to the charging of electric vehicles and in particular to the detection and notification of inoperative battery chargers.

An aspect of the present disclosure includes a battery recharging system comprising: a battery charger; and an indicator, wherein in response to the battery charger being electrically coupled to a battery a first voltage value of the battery is measured, and wherein a second voltage value of the battery is measured and the indicator is actuated in response to the value of the second voltage being less than or equal to the first voltage after a predetermined length of time.

Another aspect of the present disclosure includes a battery recharging system comprising: an initial charge detection, wherein a battery charger is electrically coupled to a battery; and an indicator, wherein in response to the initial charge detection a first voltage of the battery is measured, and wherein the indicator is actuated in response to a second voltage being less than or equal to the first voltage after a predetermined length of time.

Another aspect of the present disclosure includes an inoperable battery charger detection system comprising: a battery charger; an indicator; and a controller, wherein the controller detects an initial electrical coupling of the battery charger to a battery and measures a first voltage of the battery upon the electrical coupling, and wherein the controller measures a second voltage of the battery and actuates the indicator in response to both a continued electrical coupling between the battery charger and the battery and the second voltage being less than or equal to the first voltage after a predetermined length of time.

Another aspect of the present disclosure includes a method of detecting an inoperable battery charger, the method comprising: electrically coupling a battery charger to a battery; measuring a first voltage of the battery; subsequently measuring a second voltage of the battery; comparing the second voltage to the first voltage; and indicating an operational status of the battery charger thereby.

The foregoing and other features, advantages, and construction of the present disclosure will be more readily apparent and fully appreciated from the following more detailed description of the particular embodiments, taken in conjunction with the accompanying drawings.

BRIEF DESCRIPTION OF THE DRAWINGS

Some of the embodiments will be described in detail, with reference to the following figures, wherein like designations denote like members.

DETAILED DESCRIPTION OF EMBODIMENTS

A detailed description of the hereinafter described embodiments of the disclosed apparatus and method are presented herein by way of exemplification and not limitation with reference to the Figures listed above. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

The drawings depict illustrative embodiments of a battery recharging system 10. The embodiments may comprise various structural and functional components that complement one another to provide the unique functionality and performance of the system 10, the particular structure and function of which will be described in greater detail herein. For example, embodiments of the battery recharging system 10 may comprise one or more of a controller, a battery, and a battery charger, as well as other structural and functional components, that may be capable of establishing electrical connectivity to one another to perform their respective intended functions.

Figure 1:
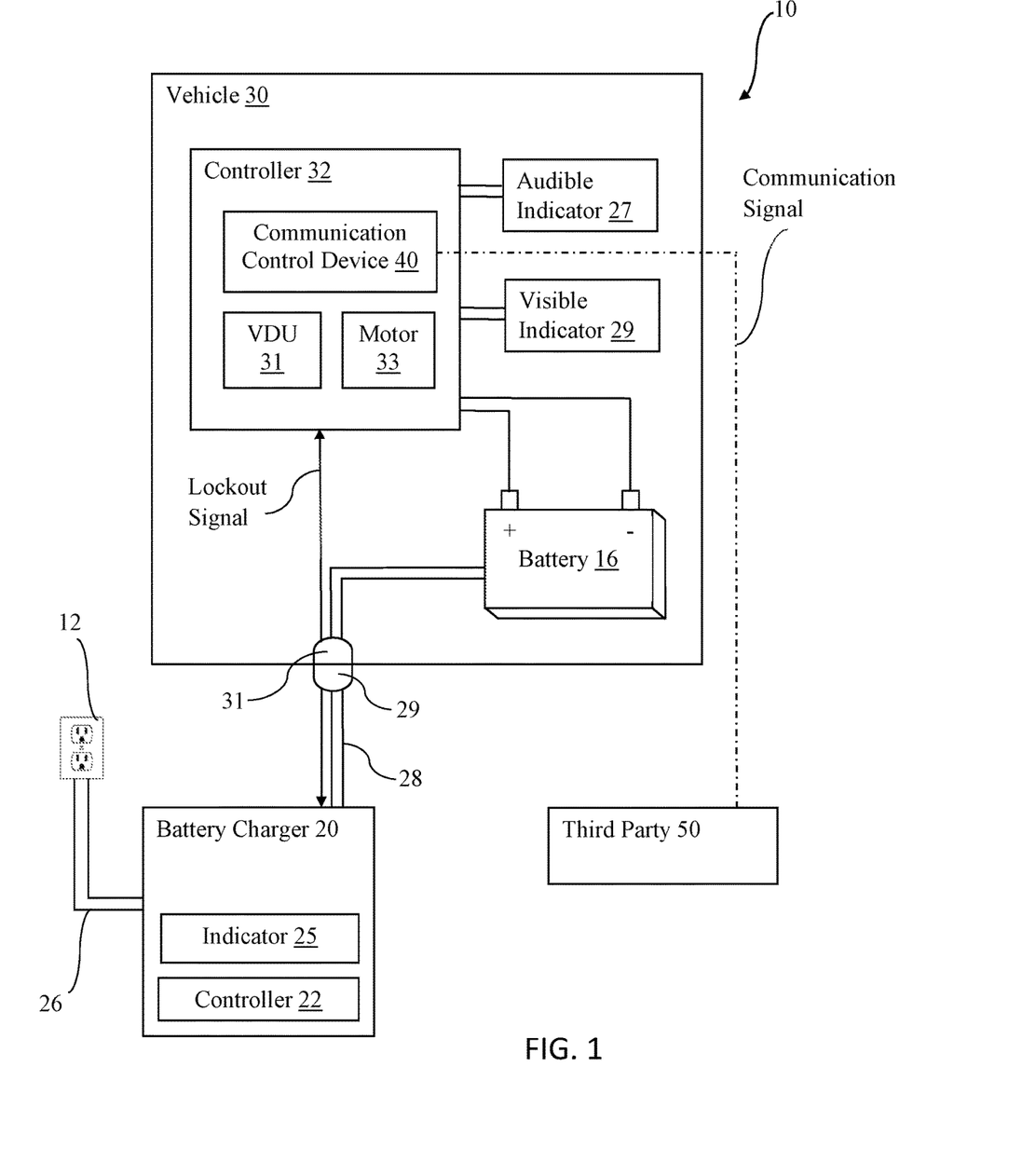
FIG. 1 is a block diagram of an embodiment of a battery recharging system in accordance with the present disclosure.

With reference to FIG. 1, embodiments of the battery charging system 10 may comprise a battery charger 20. The battery charger 20 may be a microprocessor-based, high-frequency, solid state device, capable of electrically coupling a power source 12 to a battery 16 for the purpose of recharging the battery 16. The battery charger 20 may further comprise a controller 22 configured to control and govern the operational aspects of the charger 20, including, but not limited to, the execution of the on-board software, the storing of charging and operational information in a memory, the real-time monitoring of changes in voltage in the battery 16 to deliver the appropriate charge to the battery 16, and the modification of the charge cycle depending on the needs of the battery 16. The battery charger 20 may further comprise an alternating current (AC) power cable 26 and a direct current (DC) power cable 28, each of which may be releasably detached or recoupled to the battery charger 20, as needed. In other words, each of the AC power cable 26 and the DC power cable 28 is replaceable on the battery charger 20, as needed. The AC power cable 26 may also be configured to connect to a power source 12, such as an AC power outlet, to provide power to the electrical components and functionality of the battery charger 20. The DC power cable 28 may be configured to be electrically connected to the battery 16 to establish electrical connectivity between the charger 20 and the battery 16 to permit the charger 20 to recharge the battery 16. As such, when the AC power cable 26 is plugged into the power source 12 and the DC power cable is electrically coupled to the battery 16, the charger 20 may recharge the battery 16.

Embodiments of the battery charging system 10 may comprise a battery 16. The battery 16 may be a battery system having a single battery, a bank of batteries, a bank of batteries with a dedicated controller, or the like. For example, the battery 16 may be configured as a 48 V 100 Ah battery, or other similar battery. Embodiments of the battery charging system 10 may comprise the battery 16 being a power source for an electric-powered device. Embodiments of the battery charging system 10 may comprise the battery 16 being part of a vehicle 30, such as a golf cart, utility vehicle, forklift, passenger vehicle or the like. The battery 16 may serve as the sole source of power to propel the vehicle 30, as in a traction battery pack for golf carts and utility vehicles, while in others the battery 16 may function as a supplemental power source, as with a hybrid drive. The vehicle 30 may comprise a controller 32. The controller 32 may be a microprocessor-based control unit capable of controlling, operating, monitoring, governing, or otherwise directing the operational aspects of the vehicle 30, including for example, but not limited thereto, the operations of a propulsion mechanism, such as a motor, to propel the vehicle 30, the operations of on-board software, the operations of a GPS unit, the operations of a visual display unit (VDU), and the charging and discharging of the battery 16. During operation of the vehicle 30, the controller 32 may be configured to direct power from the battery 16 to the motor to facilitate the movement of the vehicle 30, in response to user inputs, such as, for example, the user depressing the pedal of the accelerator. In other words, based on user input received and processed by the controller 32, the battery 16 may be directed by the controller 32 to deliver electrical energy to the motor to operate the motor and drive the vehicle 30.

Embodiments of the battery charging system 10 may further comprise the battery charger 20 being positioned externally to the vehicle 30, as exemplarily depicted in FIG. 1. In other words, the battery charger 20 may be separate and independent from the vehicle 30. In such embodiments, when not in use, the battery charger 20 may remain plugged into the AC power source via cable 26. Then, when the battery charger 20 is needed to recharge the battery 16 in the vehicle 30, a plug 29 at the end of the DC cable 28 may be inserted into a corresponding plug port 31 on the vehicle 30 to thereby supply power from the power source 12 to the vehicle 30, and in particular to the battery 16 on the vehicle 30. In alternative embodiments of the battery charging system 10, the battery charger 20 may be positioned internally to the vehicle 30 with the DC cable 28 already coupled between the battery charger 20 and the battery 16. As such, the battery charger 20 may be integral with the vehicle 30. In such embodiments, when the battery 16 needs to be recharged, the vehicle 30 can be attached via AC cable to the AC power source.

With the battery charger 20 in either an external or internal configuration with the vehicle 30, as described herein, the battery charger 20 and its associated controller 22 may be configured to communicate a power connection signal (i.e., a power detection signal) when the battery charger 20 is electrically coupled between the AC power source, such as external power source 12, and the DC power source, such as the battery 16. The power connection signal (i.e., power detection signal) may be sensed by the controller 32 on the vehicle 30. The controller 32 may be configured to use the power connection signal from the battery charger 20 to govern the operational aspects of the vehicle 30 accordingly. For example, the controller 32, upon sensing the power connection signal, may send a lockout signal to the motor 33 to prevent the motor 33 from engaging or otherwise spinning. In particular, a traction control or interlock circuit in the controller 32 may monitor the event of connecting the battery 16 to the power source 12 by way of the battery charger 20. The act of coupling the plug 29 to the corresponding plug port 31 may complete the charge circuit between the charger 20 and the battery 16, which may cause a change in an electrical parameter, such as a change in voltage or other electrical parameter, between the battery 16 and the controller 32. This change in parameter may be the power connection signal sensed by the controller 32, causing the controller 32 to send the lockout signal to the motor 33 to prevent movement of the vehicle 30.

By sensing the electrical parameter change, the controller 32 may be configured to transition the motor 33, and thus the vehicle 30, between the locked-out state and an operational state. For example, while electric power is being delivered from the external power source 12 to the battery 16, via the battery charger 20, the voltage supplied from the battery 16 to the controller 32 is relatively low and the interlock circuit within the controller 32 can continue to disable the motor so that the vehicle 30 is prevented from being operated, moved, or the like. With the motor/vehicle 30 in the locked-out state, the motor will not operate and the vehicle 30 will remain stationary. The motor may remain in this locked out state to prevent movement of the vehicle 30 so long as the battery 16 is electrically coupled to the power source 12 via the battery charger 20. However, once the battery 16 is disconnected from the battery charger 20, the controller 32 may be configured to sense the change in voltage between the battery 16 and the controller 32 may respond to the change in voltage by terminating the lockout signal to the motor to thus enable the motor. With the motor placed in the operational state, the movement of the vehicle 30 is no longer restricted and/or disabled and the vehicle is permitted to be moved or operated, as needed.

Embodiments of the battery charging system 10 may comprise the controller 32 being configured to govern one or more of the operational aspects of the vehicle 30 based on inputs received by the controller 32 from such components as, for example, the vehicle 30, the battery 16, and/or the battery charger 20. The controller 32 may be configured to receive and send electrical and data communication to one or more of the communication control device 40, the VDU 31, the audible indicator 27, the visible indicator 29, and/or the motor 33, as described herein and as schematically depicted in FIG. 1, to control and govern the operational aspects thereof. Moreover, embodiments of the battery charging system 10 may comprise the controller 32 being a stand-alone traction control circuit or a traction controller that is configured to receive and send data, signal, and electrical input from, for example, the battery 16, the battery charger 20, and/or the vehicle 30 to thereby communicate operational instructions to these and other components of the vehicle 30. For example, once the traction controller receives the electrical parameter change described herein, the traction controller may send the lockout signal to the motor 33, which may be a separate component from the controller 32. Further in example, the traction controller may be configured to communicate with the VDU 31 and communication control device 40 via a communication bus that allows the traction controller to provide operational instructions to the VDU 31 and the communication control device 40. Indeed, one or more communication buses may be configured between component parts of the system 10, as needed, to provide adequate communication capability therebetween, as described herein. The traction controller may be further configured to communicate with the audible indicator 27 and the visible indicator 29 to govern their respective operations and functions. In this way, the traction controller may operate and function to control the other operational aspects of the vehicle 30 described herein. And, in addition thereto, embodiments of the system 10 may further comprise the various component parts of the system 10 being arranged in other variable configurations that allow the system 10 to function as herein described.

Embodiments of the battery charging system 10 may further comprise the VDU 31 being configured to include the communication control device 40, so that the wireless communication signal that is sent to a third party 50, to be described in greater detail herein, may be sent to the third party 50 by way of the communication control device 40 as part of the VDU 31. For example, using the capability of the VDU 31, a wireless communication signal may be sent via a web server, a wireless network, Bluetooth, Wi-Fi, a cellular or mobile network, and/or other wireless communication means by the communication control device 40 to the third party 50 to provide information to the third party 50 about a particular vehicle 30 and its operational status, including historical status and real-time status.

Embodiments of the battery charging system 10 may further comprise one or more status indicators configured to communicate one or more operational aspects of the power source 12, the battery charger 20, the battery 16, and/or the vehicle 30 to a third party 50, such as an operator, attendant, and/or user. For example, one or more charger indicators 25 configured on the battery charger 20 may communicate an operational status of the battery charger 20. One or more of the charger indicators 25 may indicate whether or not the battery charger 20 is electrically coupled to the power source 12. Such an indicator may be an LED light that lights up in response to the battery charger 20 being electrically coupled to the AC power source 12. Another of the charger indicators 25 may be an LED light that lights up to indicate the amount of charge remaining in the battery 16. Another of the charger indicators 25 may indicate one or more general operational problems with the battery charger 20. These charger indicators 25, for example, may thus communicate the operational status of the battery charger 20 to the third party 50.

Other status indicators in the battery charging system 10 may be configured on the vehicle 30 to communicate an operational status of the battery charger 20, the battery 16, and/or the vehicle 30 to the third party 50, such as an operator, attendant, and/or user. For example, when the controller 32 of the vehicle 30 senses the power connection signal connection between the power source 12 and the battery 16, through the battery charger 20, the controller 32 may instruct an audible indicator 27 on the vehicle 30 to sound an audible signal to alert the third party 50 that electrical connection has been established between the power source 12 and the battery 16. The audible indicator 27 may be a buzzer, beeper, or other audible device capable of making an audible noise/alert, such as a speaker.

Embodiments of the battery charging system 10 may comprise the audible indicator 27 being the normal indicator that is customarily used on golf carts and other utility vehicles to indicate the vehicle 30 is in reverse mode. For example, when a transmission control or other equivalent directional control of the vehicle 30 is placed into a reverse setting, the controller 32 may be configured to actuate the audible indicator 27 to generate a beep. The controller 32 can be configured to actuate the same audible indicator 27 when the vehicle 30 is being recharged. The audible indicator 27 may be an additional indicator, but need not be as the existing audible indicator of the vehicle 30 may be used. Moreover, as suggested, the same audible sound may be used to indicate both charging and reverse mode, but embodiments of the charging system 10 may include different audible sounds, different audible sound patterns, and/or different audible sound tones being generated for reverse and for charging, to thereby distinguish therebetween. Further still, the controller 32 may be configured to instruct the VDU and/or the on-board speakers of the vehicle 30 to be the audible indicator 27 to generate the audible alert for charging connection (i.e., the power connection signal).

In addition or in the alternative, the battery charging system 10 may further comprise a visual indicator 29 to communicate an operational status of the battery charger 20, the battery 16, and/or the vehicle 30 to the third party 50, such as an operator, attendant, and/or user. For example, although the audible indicator 27 has been herein described in association with charging status, the visual indicator 29 may be used to additionally or alternatively communicate charging status to the third party 50. That is, the visual indicator 29 may be used separately from the audible indicator 27 or as a supplement to the audible indicator 27. For example, embodiments of the battery charging system 10 may comprise the controller 32, in response to the sensing of the power connection signal, utilizing the VDU 31 to visually indicate to the third party 50 one or more operational aspects of the battery charger 20, the battery, or the vehicle 30 itself. The controller 32 may instruct the VDU to display an acknowledge button or icon that may permit the third part 50 to silence the audible indicator 27. The controller 32 may further provide instructions to the third party 50 as to what additional steps, if any, may need to be taken to ensure proper charge between the power source 12 and the battery 16.

Embodiments of the battery charging system 10 may further comprise the charging system 10 being configured to identify, or otherwise recognize, an inoperable battery charger 20, or a battery charger 20 that fails to provide electric charge to the battery 16. For example, the controller 32 may be configured to determine a circumstance when the battery charger 20 is electrically coupled between the power source 12 and the battery 16 but the battery charger 20 fails to charge the battery 16. In such circumstances the battery charger 20 may be an inoperable battery charger, or a battery charger 20 that does not perform its intended function.

Figure 2:
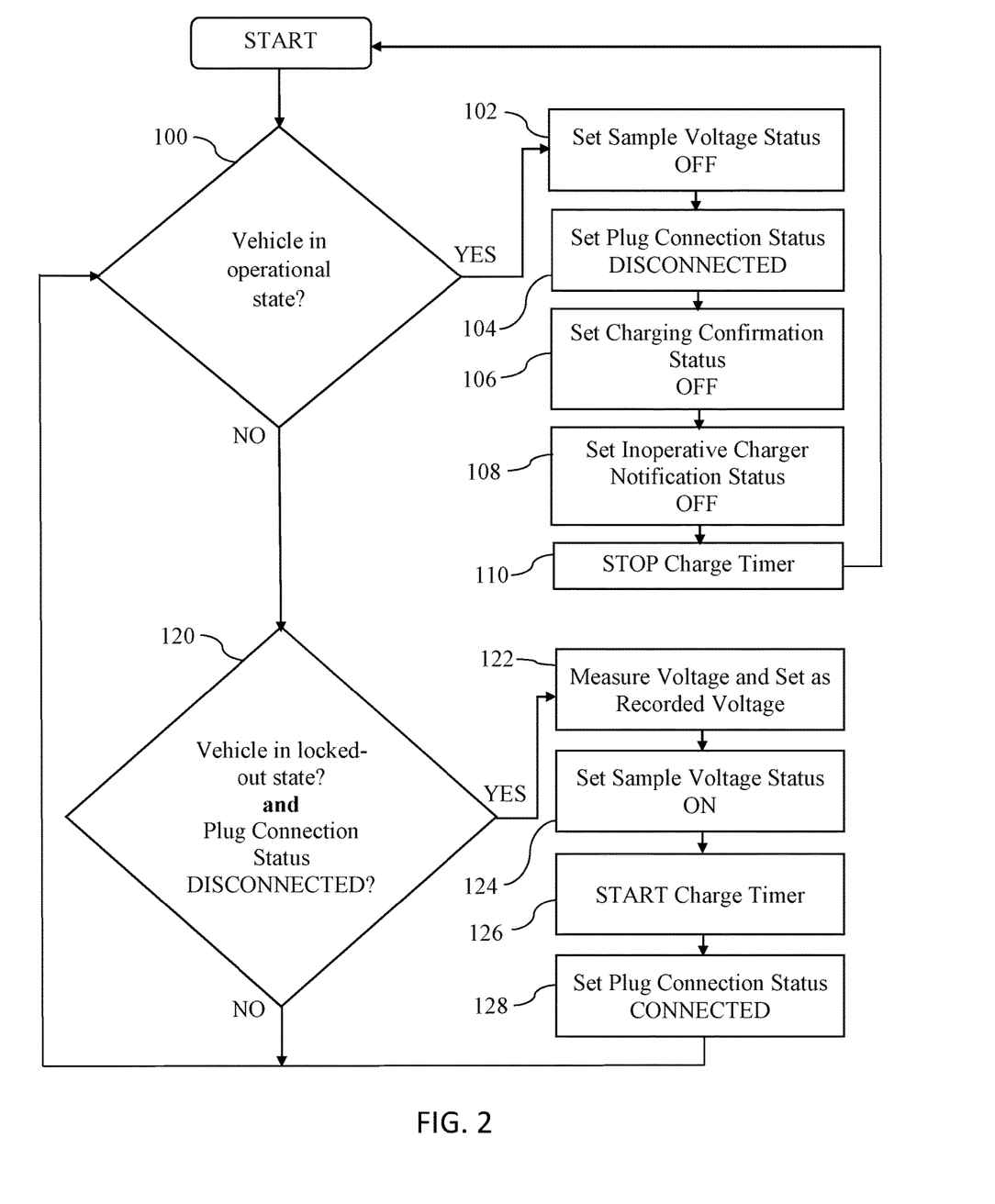
FIG. 2 is a flowchart of the control logic associated with a battery charging detection event of an embodiment of a battery recharging system in accordance with the present disclosure.
Figure 3:
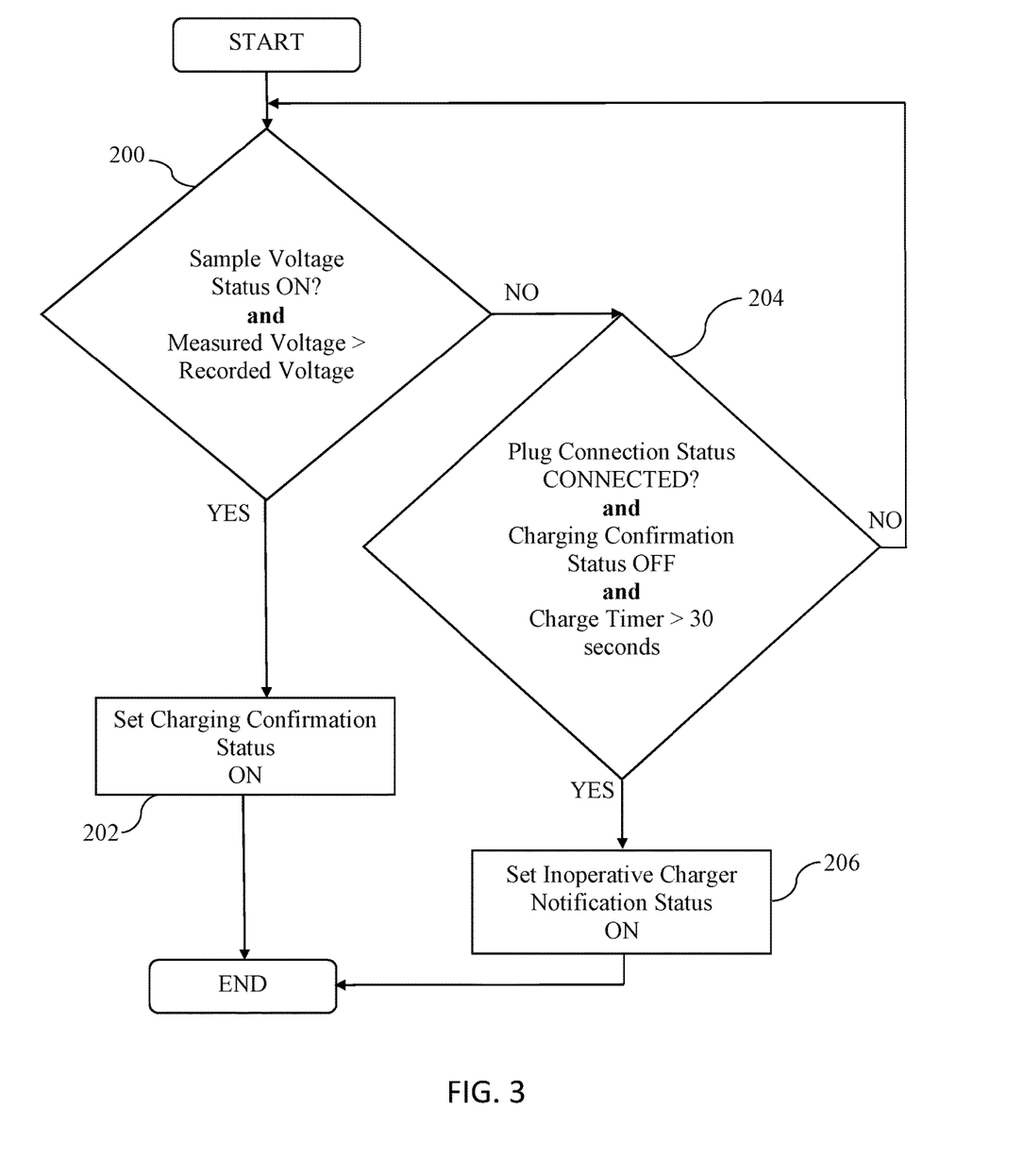
FIG. 3 is a flowchart of the control logic associated with a battery charging detection event of an embodiment of a battery recharging system in accordance with the present disclosure.

FIGS. 2 and 3 are flow charts illustrating operations of the battery charging system 10 according to embodiments. In step 100, an initial power connection may be monitored, such as, for example, the presence or absence of the power connection signal generated between the power source 12 and the battery 16 when the battery charger 20 is electrically coupled therebetween. Further in example, the initial power connection that is monitored may be the interlock signal generated by the interlock circuit of the controller 32 that disables the motor of the vehicle 30. At any rate, in step 100, the determination may be made as to whether the battery charger 20 is plugged into the vehicle 30 to establish electrical connectivity between the power source 12 and the battery 16 of the vehicle 30. If the battery charger 20 is not plugged into the vehicle 30, the controller 32 keeps the vehicle 30 in an operational state and, in step 102, turns the instruction to sample the battery voltage for the purpose of testing for an inoperable charger to OFF. Without the battery charger 20 connected, there is no need to attempt to sample the battery voltage to test for an inoperable charger. In step 104, the controller 32 sets the connection status between the battery charger 20 and the vehicle 30 to DISCONNECTED to reflect that the battery charger 20 is indeed disconnected from the vehicle 30. In step 106, the controller 32 sets the charging confirmation status of the battery 16 to OFF, because without the battery charger 20 charging the battery 16 there may be no need to confirm the charge. In step 108, the controller 32 sets the inoperative battery charger notification to OFF, because without the battery charger 20 connected the controller 32 need not monitor the operational status thereof. In step 110, the controller 32 turns the timer associated with the time the battery 16 has been charging to OFF because without the battery charger 20 connected to the battery 16, there is no charge time to monitor or count. When steps 102, 104, 106, 108 and 110 have been accomplished, the controller 32, in step 100, thereafter continues to look for the initial power connection from the battery charger 20 between the power source 12 and the battery 16.

When the battery charger 20 is indeed plugged into the vehicle 30 to recharge the battery 16, the controller 32 senses the initial power connection and disables the vehicle 30 through the interlock circuit of the vehicle harness, as described herein. With the battery charger 20 electrically connected to the vehicle 30 (and its battery 16) and the vehicle 30 in the locked-out status, in step 120, the controller 32 nevertheless confirms that the vehicle is in locked out status and that the connection status between the battery charger 20 and the vehicle 30 is set to DISCONNECTED. Under these conditions, in step 122, the controller 32 samples the voltage of the battery 16 and records this sample voltage as the current battery voltage. The recorded voltage may be stored in a memory of the controller 32. In 124, the controller 32 may set the status of the control logic for determining the presence of an inoperable charger to ON. FIG. 3 illustrates in greater detail the control logic for determining the presence of an inoperable charger, which will be discussed in greater detail herein.

In step 126, the controller 32 turns the timer associated with the time the battery 16 has been charging to ON to track the amount of time that has passed since the controller 32, in step 104, measured the battery voltage and recorded the same in the controller's 32 memory. In step 128, the controller 32 sets the connection status between the battery charger 20 and the vehicle 30 to CONNECTED to confirm that the battery charger 20 is indeed electrically coupled to the battery 16. At this stage, therefore, the electrical connection of the battery charger 20 to the battery 16 has been detected, the vehicle 30 has been placed in the locked-out state, the initial battery voltage has been measured and recorded, the controller 32 has been instructed to begin the control logic for the detection of an inoperable battery charger, and the timer for measuring the time the battery 16 has been charging has been started. The control logic of FIG. 2 then returns to step 100 and continues to loop to step 120 and back to step 100, repeatedly, until the battery charger 20 is disconnected from the vehicle 30 and the vehicle's interlock circuit ceases the lockout of the motor and traction control, at which point the control logic flows from step 100 to step 102 and on through step 110, as described above.

With the status of the control logic for determining the presence of an inoperable charger set to ON, from step 124, the controller 32 may begin to govern and perform the control logic illustrated in FIG. 3. For example, in 200, the controller 32 may confirm that the control logic for determining the presence of an inoperable charger is indeed set to ON. The controller 32 may also continue to measure the voltage of the battery 16 and compare the measured voltage to the recorded voltage stored in the memory from step 122. In general, when the battery charger 20 is electrically coupled to the battery 16 and operating according to its intended function, the voltage in the battery 16 should rise over a given time period. Thus, if in step 200 the measured voltage is greater than the recorded voltage, the controller 32 may confirm the battery charger 20 is operative (i.e., operating according to its intended function and delivering electric charge to the battery 16) and proceed to step 202. In step 202, the controller 32 may change the status of the charging confirmation status of the battery 16 from OFF to ON to thereby confirm to the battery charging system 10 that the battery charger 20 is functioning properly. The battery charger 20 may thereafter continue to charge the battery 16 until the third party 50 desires to disconnect the battery charger 20 from the vehicle 30, at which point the control logic flows from step 100 to step 102 and on through step 110, as described above and set forth in FIG. 2.

On the other hand, if the measured voltage from step 200 is less than or equal to the recorded voltage from step 122, then the controller 32 may be required to confirm several other charging parameters to confirm whether or not the battery charger 20 is operative or inoperative. For example, in step 204, the controller 32 confirms that the connection status between the battery charger 20 and the vehicle 30 is still set to CONNECTED to confirm that the battery charger 20 is indeed electrically coupled to the battery 16. In step 204, the controller 32 also confirms that the status of the charging confirmation status of the battery 16 is still set to OFF to thereby confirm that the controller 32 has not yet confirmed that the battery charger 20 is functioning properly to deliver an adequate charge to the battery 16. In step 204, the controller 32 may also compare the elapsed time measured by the timer in step 126 to a predetermined time. Time can be used to calculate an expected rise in voltage in the battery 16. For example, based on the laws of physics and the configuration of the battery charger system 10, for a predetermined interval of time, the controller 32 may expect or otherwise anticipate from calculations that the battery charger 20, functioning properly, has had enough time to raise the voltage of the battery 16 above the initial recorded voltage. If the battery charger 20 cannot meet these predetermined requirements, the controller 32 may conclude that the battery charger 20 is inoperative. Thus, in step 204, if the measured time is below the predetermined time, then the controller 32 may instruct the system 10 to return to step 200 for the voltage of the battery 16 to be measured again. Step 200 is thus repeated and the measured voltage is compared with the recorded voltage from step 122. As described above, if the measured voltage is greater than the recorded voltage, the controller 32 may proceed to step 202 and confirm the battery charger 20 is operative. On the other hand, if the measured voltage is less than or equal to the recorded voltage, the control logic may proceed to step 204. In step 204, the measured time is again compared to the predetermined time. If the measured time is still less than the predetermined time, the step 200 may be repeated again. Yet, if the measured time is greater than or equal to the predetermined time, then the controller 32 may conclude that the battery charger 20 has had ample time to raise the voltage of the battery 16 above the recorded voltage (i.e., initial voltage when the battery charger was connected) and has not been able to do so. Under these circumstances, the controller 32 may determine in step 206 that the battery charger 20 is inoperative.

Embodiments of the battery charging system 10 may comprise the controller 32 being configured to communicate the inoperative status of the battery 16 to the third party 50 by way of the indicators 25, 27 and/or 29 or by another means. For example, the controller 32 may generate an audible alert through the audible indicator 27 to indicate to the third party 50 that the battery charger 20 is inoperative. In like manner, the controller 32 may generate a visual alert through the visual indicator 29 to indicate to the third party 50 that the battery charger 20 is inoperative. By way of example, once the system 10 determines that the battery charger 20 is inoperative, the controller 32 may instruct the audible and visual indicators 27 and 29, as part of the VDU controlled and operated by the controller 32, to alert the third party 50 as to the status of the battery charger 20. The VDU may have a button or control thereon that allows the third party 50 to silence the audible alert. The VDU may also display instructions thereon to the third party 50 as to how to address the inoperative battery charger 20, such as repairing, resetting, or replacing the battery charger 20.

Embodiments of the battery charging system 10 may comprise other means by which the system 10 may communicate the status of the inoperative battery charger 20 to the third party 50. For example, embodiments of the battery charging system 10 may comprise a communication control device 40 that can be configured to wirelessly connect to a communications network, web server, or other internet-enabled devices, and/or the internet through WiFi, cellular modem, Bluetooth, or other similar wireless technology. The status of the electrical connection of the battery charger 20 to the vehicle 30 and the battery voltage may be communicated at periodic intervals to the communication control device 40, as well as the controller 32, to keep the communication control device 40 and controller 32 up to date. As such, the controller 32 may be configured to wirelessly communicate, even in real-time, with the third party 50 regarding the status of the power source 12, the battery charger 20, the battery 16, and/or the vehicle 30. For example, if and when the system 10 detects an inoperative battery charger 20, the controller 32 and the communication control device 40 may function to wirelessly transmit a communication, such as an e-mail, text message, social media post, or the like, to the third party 50. The communication may include such information as site name, site location, site identification, vehicle number, and time of detection, for example.

Embodiments of the battery charging system 10 may be configured with a switch or control to disable or otherwise alter the performance of the system 10 for vehicles 30 that are operated within a Watt Miser system that charges at off-peak times.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the present disclosure, as required by the following claims. The claims provide the scope of the coverage of the present disclosure and should not be limited to the specific examples provided herein.

What is claimed is:

1. A system for detecting an inoperative battery charger for a vehicle comprising:
   a rechargeable battery;
   a battery charger configured to electrically couple to and thereby establish an initial electrical coupling with the rechargeable battery to produce a power connection signal;
   a microprocessor-based control unit configured to detect the power connection signal, and in response to the detection, disable the vehicle by entering the vehicle in a locked-out state; and
   an indicator in communication with the microprocessor-based control unit and configured to identify an operational status of the battery charger,
   wherein, when the microprocessor-based control unit confirms both that the vehicle is in the locked-out state and that a plug connection status has been set to disconnected, the microprocessor-based control unit measures a first voltage value of the rechargeable battery and, after a predetermined period of time has passed from the initial electrical coupling, measures a second voltage value of the rechargeable battery, and
   wherein, the microprocessor-based control unit changes the plug connection status from disconnected to connected in response to a confirmation of the presence of the power connection signal to reflect that the battery charger and vehicle are electrically connected, and
   wherein, when the microprocessor-based control unit determines the value of the second voltage is less than or equal to the first voltage value and confirms the plug connection status as connected, but has not yet confirmed that the charger is operable, the microprocessor-based control unit actuates the indicator to indicate the operational status of the battery charger as inoperable, the operational status of the battery charger as being inoperable being determined after a predetermined period of time from the initial electrical coupling.

2. The system of claim 1, wherein the indicator is one or more of an audible signal and a visual signal.

3. The system of claim 1, wherein the indicator is a wireless communication signal.

4. The system of claim 3, wherein the wireless communication signal is transmitted to a remote third party via a wireless connection.

5. The system of claim 1, wherein the microprocessor-based control unit measures the predetermined period of time by tracking the time that has passed since the measured first voltage value.

6. A method of detecting an inoperable battery charger of a vehicle, the method comprising:

establishing an electrical coupling between a battery charger and a rechargeable battery to produce a power connection signal;

detecting by a microprocessor the power connection signal, and in response to the detection, disabling the vehicle by entering a locked-out state;

measuring by the microprocessor a first voltage of the battery in response to confirming both that the vehicle is in the locked-out state and that a plug connection status has been set to disconnected;

subsequently measuring a second voltage of the battery;

changing by the microprocessor the plug connection status from disconnected to connected in response to a confirmation of the presence of the power connection signal to reflect that the battery charger and vehicle are electrically connected; and after confirming the plug connection status as connected and the microprocessor is not indicating that the battery charger is operable, indicating an operational status of the battery charger as inoperable in response to the second voltage being less than or equal to the first voltage, the operational status of the battery charger as being inoperable being determined after a predetermined period of time from the electrical coupling.

7. The method of claim 6, further comprising wirelessly transmitting the operational status of the battery charger to a remote third party.

8. The system of claim 2, wherein the predetermined period of time is about 30 seconds.

9. The method of claim 6, wherein the predetermined period of time is about 30 seconds.

* * * * *